(12) United States Patent
Umeda (10) Patent No.: US 12,397,715 B2
(45) Date of Patent: Aug. 26, 2025

(54) STORAGE DEVICE FOR VEHICLE AND METHOD OF ASSEMBLING STORAGE DEVICE

(71) Applicant: MORIROKU TECHNOLOGY COMPANY, LTD., Tokyo (JP)

(72) Inventor: Keisuke Umeda, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 709 days.

(21) Appl. No.: 17/697,404

(22) Filed: Mar. 17, 2022

(65) Prior Publication Data

US 2022/0306005 A1     Sep. 29, 2022

(30) Foreign Application Priority Data

Mar. 26, 2021   (JP) ................................. 2021-052934

(51) Int. Cl.
*B60R 7/04*         (2006.01)
*B60R 11/00*        (2006.01)

(52) U.S. Cl.
CPC ......... *B60R 7/04* (2013.01); *B60R 2011/0007* (2013.01)

(58) Field of Classification Search
CPC ..... B60R 7/06; B60R 7/04; B60R 2011/0007; E05D 7/1072
USPC ....................................................... 296/37.8
See application file for complete search history.

(56) References Cited

U.S. PATENT DOCUMENTS

| | | | | |
|---|---|---|---|---|
| 6,926,332 B2 * | 8/2005 | Youngs | ................... | B60R 7/081 |
| | | | | 224/544 |
| 7,243,970 B2 * | 7/2007 | Kogami | ................... | E05B 83/32 |
| | | | | 296/37.9 |
| 7,832,054 B2 * | 11/2010 | Nakasone | ................. | B60R 7/04 |
| | | | | 16/337 |
| 10,533,351 B2 * | 1/2020 | Yano | ......................... | B60R 7/04 |
| 10,760,313 B2 * | 9/2020 | Alvarez Lopez | ......... | B60R 7/04 |
| 11,040,664 B2 * | 6/2021 | Woods | ................ | B29C 45/1418 |
| 11,230,229 B2 * | 1/2022 | Iwazaki | ..................... | B60R 7/04 |
| 2013/0111706 A1 * | 5/2013 | Anderson | ............. | E05D 11/087 |
| | | | | 16/342 |
| 2013/0300144 A1 * | 11/2013 | Rose | ......................... | B60R 7/04 |
| | | | | 29/428 |

(Continued)

FOREIGN PATENT DOCUMENTS

| | | | | |
|---|---|---|---|---|
| JP | S56-14249 | 2/1981 | | |
| JP | 2005-054960 A | 3/2005 | | |
| JP | 2008133680 A * | 6/2008 | ............... | B60R 7/04 |

(Continued)

*Primary Examiner* — Jason S Morrow
(74) *Attorney, Agent, or Firm* — Rankin, Hill & Clark LLP (57) ABSTRACT

A vehicle storage device includes a storage portion that has an opening in its one face and is configured to store at least one thing therein, a bracket body fixed to an attaching surface portion, which is another face of the storage portion, a shaft member supported on the bracket body, a lid supported on the shaft member such that the lid can swing to open and close at least part of the opening of the storage portion, and a coil spring configured to bias the lid in an opening direction. The bracket body includes at least one engaging portion that extends along the attaching surface portion. The attaching surface portion includes at least one engaged portion that has an opening to receive the respective engaging portion.

3 Claims, 8 Drawing Sheets

(56) References Cited

U.S. PATENT DOCUMENTS

2020/0361402 A1* 11/2020 Tsalenko ................ B62D 65/14
2021/0053474 A1* 2/2021 Chen ..................... B60N 2/793

FOREIGN PATENT DOCUMENTS

| | | |
|---|---|---|
| JP | 2008-273340 A | 11/2008 |
| JP | 2009-023575 A | 2/2009 |
| JP | 2001-084142 A | 4/2011 |
| JP | 2012-001103 | 1/2012 |
| JP | 2013-147223 A | 8/2013 |
| JP | 2015-224487 A | 12/2015 |

* cited by examiner

STORAGE DEVICE FOR VEHICLE AND METHOD OF ASSEMBLING STORAGE DEVICE

FIELD OF THE INVENTION

The present invention relates to a technology for assembling a storage device for a vehicle.

BACKGROUND OF THE INVENTION

For example, a storage device for a vehicle is provided between a driver's seat and a passenger's seat in a passenger vehicle for receiving and storing goods and belongings (i.e., things) of a person in the vehicle. One of the conventional storage devices for vehicles is disclosed in JP-A-2012-1103.

The vehicle storage device disclosed in JP-A-2012-1103 includes a box body having an open upper surface, a shaft-supporting bracket fixed on a rear surface of the box body for supporting a rotating shaft, a swingable lid body supported by the shaft-supporting bracket via a movable bracket such that the lid body can open and close, and a torsion coil spring disposed on the shaft-supporting bracket for biasing the lid body in the opening direction via the movable bracket.

SUMMARY OF THE INVENTION

An assembly work of such a vehicle storage device may be carried out by, for example, temporarily assembling and uniting the brackets, a shaft member, the coil spring and the lid body and placing the brackets in predetermined positions of a storage portion.

However, in many cases, the lid is large and heavy as compared to the brackets. Therefore, when placing the brackets in the predetermined positions of the storage portion, it is necessary to perform the placing work while supporting the weight of the lid. Alternatively, the lid may be closed and held by a holding element provided at the storage portion, and then the brackets may be placed in the predetermined positions of the storage portion. In this case, however, it is necessary to perform the placing work while pressing the brackets toward the storage portion against the biasing force of the coil spring.

On the other hand, if the assembly work is carried out by placing the brackets in the predetermined positions of the storage portion and subsequently attaching the coil spring and other members, it is difficult to secure the space required for the work. Therefore, this assembly work cannot be employed.

An object of the present invention is to provide a storage device for a vehicle which can be easily assembled.

According to one aspect of the present invention, there is provided a storage device for a vehicle that includes:
a storage portion that has an opening in its one face and is configured to store thing therein;
a bracket body fixed to an attaching surface portion, which is another face of the storage portion;
a shaft member supported on the bracket body;
a lid supported on the shaft member such that the lid can swing to open and close at least part of the opening of the storage portion; and
a coil spring configured to bias the lid in an opening direction,
wherein the bracket body includes at least one engaging portion that extends along the attaching surface portion, and
the attaching surface portion includes at least one engaged portion that has an opening to receive the respective engaging portion.

According to another aspect of the present invention, there is provided a method of assembling a storage device for a vehicle. The method includes:
a preparation step of preparing a storage portion that has one opening in its one face and at least one engagement portion formed on an attaching surface of the storage portion, a bracket body that has at least one engaging portion, a shaft member, a lid, and a coil spring;
a temporary assembly step of temporarily assembling the bracket body, the shaft member, the lid, and the coil spring;
a temporary fixing step of inserting the respective engaging portion of the bracket body, on which the lid and the coil spring are temporarily assembled, into the respective engaged portion to temporarily fix the bracket body to the storage portion; and
a fixing step of fixing the bracket body, which is temporarily fixed to the storage portion, to the attaching surface.

DETAILED DESCRIPTION OF THE PREFERRED EMBODIMENTS

Embodiments of the present invention will be described below with reference to the accompanying drawings. In the following description, the terms "left" and "right" refer to the left and right when viewed from a person in a vehicle, and the terms "front" and "rear" refer to the front and rear when viewed in the traveling direction of the vehicle. In addition, "Fr" in the drawing represents the front, "Rr" represents the rear, "Le" represents the left when viewed from the person in the vehicle, "Ri" represents the right when viewed from the person in the vehicle, "Up" represents the top or up, and "Dn" represents the bottom or down.

Embodiments

Figure 1:
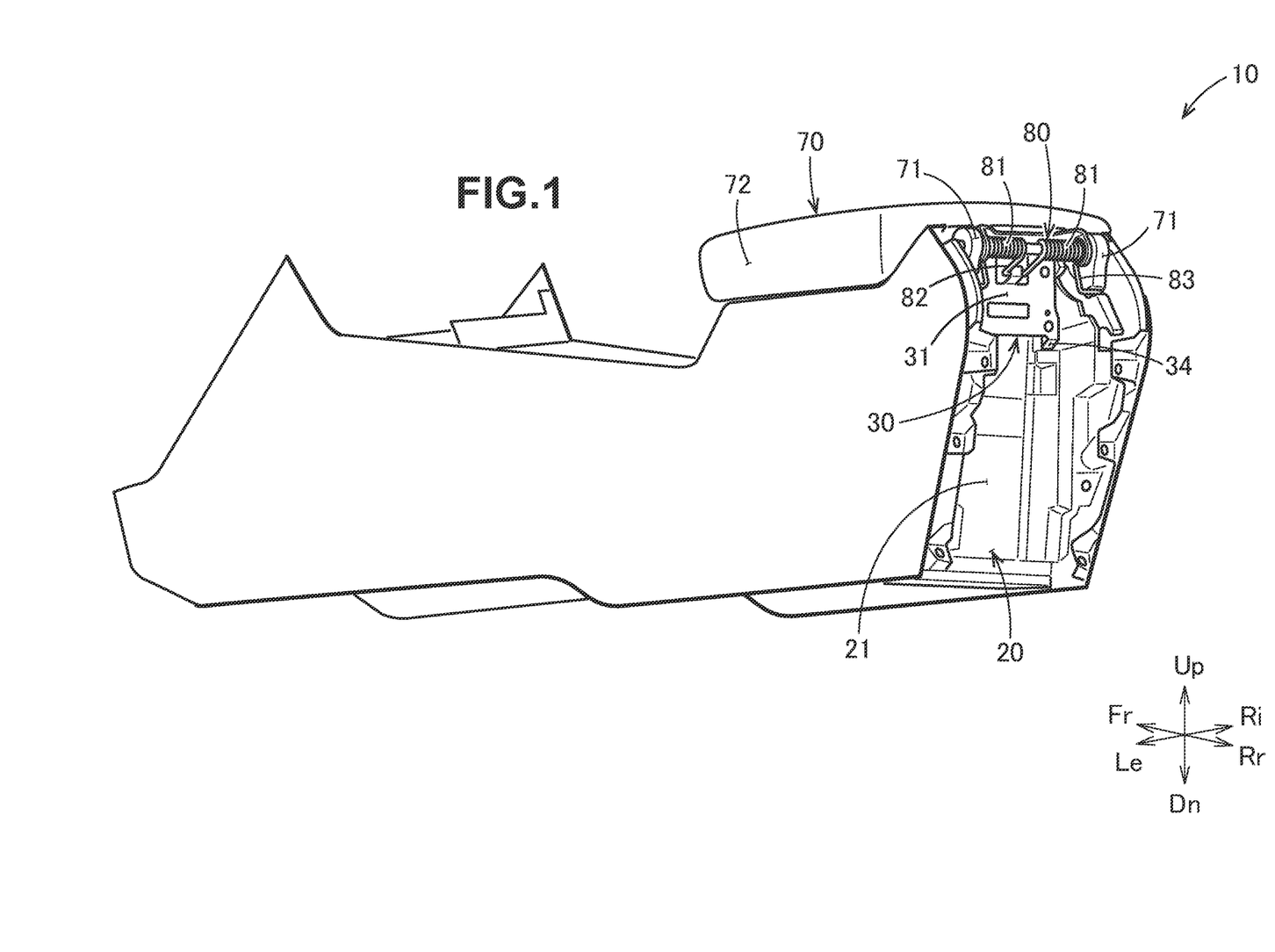
FIG. 1 is a perspective view of a vehicle storage device according to an embodiment of the invention when viewed from a left rear position at a certain angle.

Referring to FIG. 1, a vehicle storage device 10 (hereinafter, referred to as "storage device 10") is, for example, a center console provided between a driver's seat and a passenger's seat in a vehicle cabin. In the following description, the center console will be described as an example of the storage device 10.

Referring FIGS. 2 and 3, the storage device 10 includes a storage portion 20 having an open top surface and capable of storing one or more goods of a person in the vehicle (hereinafter referred to as "storage items" or "things"), a bracket body 30 fixed to a rear surface portion 21 which is a rear surface of the storage portion 20, support portions 40 and 40 extending rearward from left and right ends of the bracket body 30, a shaft member 50 supported by the support portions 40 and 40, a lid 70 swingably supported by the shaft member 50 and capable of opening and closing the opening of the storage portion 20, a coil spring 80 provided to surround the shaft member 50 and urge the lid 70 in an opening direction, and a lid holding portion 17 provided in a front upper portion of the storage portion 20 and capable of holding the lid 70 in a closed state.

The storage portion 20 is formed of resin and has a substantially rectangular parallelepiped shape with only an upper surface opened. The rear surface portion 21 may be referred to as an attaching surface portion 21 to which the bracket body 30 is attached. In the following description, the rear surface portion 21 may occasionally be referred to as an attaching surface portion 21.

Figure 4:
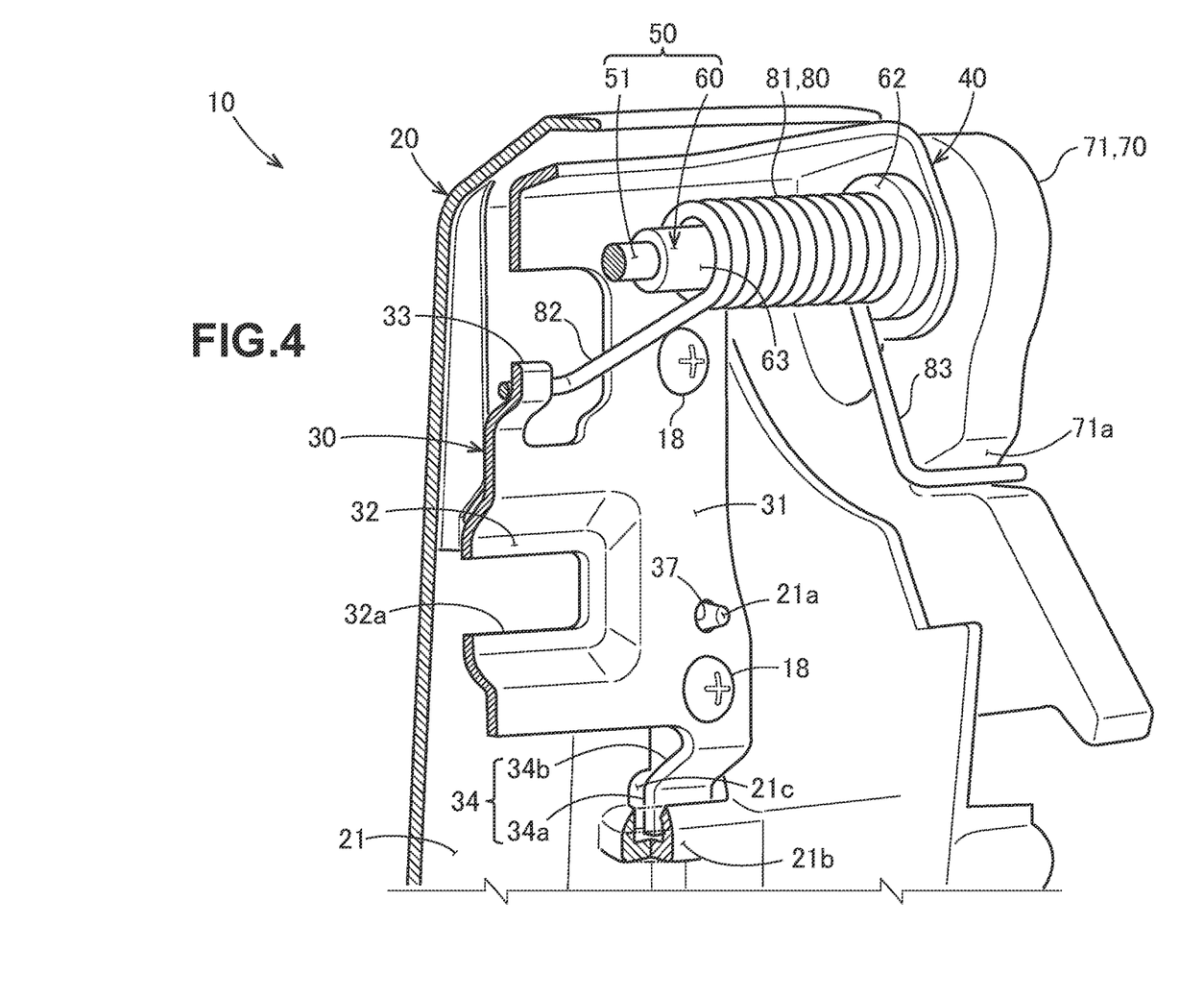
FIG. 4 is an enlarged view of a part 4 in FIG. 2.

Referring to FIG. 4, the storage portion 20 has positioning protrusions 21a that protrude rearward from the attaching surface portion 21 to guide an attaching position of the bracket body 30. Each of the positioning protrusions 21a has a circular truncated cone shape whose diameter decreases toward the tip. Alternatively, each of the positioning protrusions 21a may be a cross-shaped rib.

The attaching surface portion 21 also has engaged portions 21b, each of which protrudes rearward in a substantially U shape, such that a lower end of the bracket body 30 is inserted in the engaged portions 21b. Those portions of the attaching surface portion 21 which face the engaged portions 21b are referred to as bottom portions 21c.

Incidentally, since the only role of the respective engaged portion 21b is to receive the bracket body 30, the respective engaged portion 21b may have a shape other than substantially U shape, such as substantially L shape. Further, as long as the engaged portion 21b can receive the bracket body 30, a lower surface of the engaged portion 21b may be open. The engaged portion 21b is required to have the open port to receive the bracket body 30.

Further, the bottom portion 21c is not an indispensable element, and this portion may be dispensed with. It should be noted, however, that preferably the portion that faces the engaged portion 21b is closed by the bottom portion 21c rather than a hole. The reason will be described later.

Figure 3:
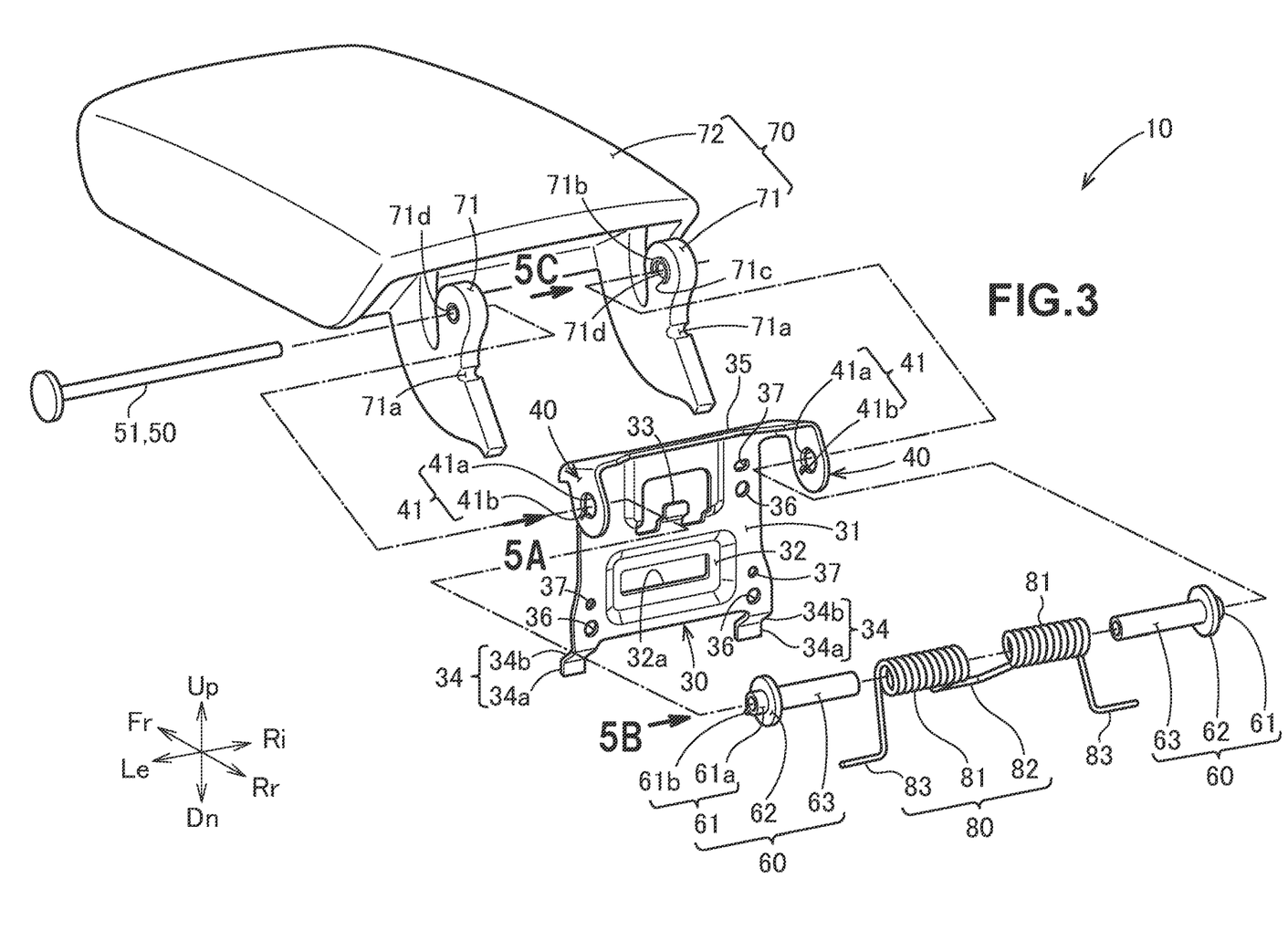
FIG. 3 is an exploded perspective view of a bracket body, a support portion, a shaft member, a lid and a coil spring shown in FIG. 2.

Referring also to FIG. 3, the bracket body 30 is constituted by a single metal plate together with the support portions 40 and 40. The bracket body 30 includes a general surface portion 31 that defines a general face along the attaching surface portion 21 and has a substantially rectangular planar shape, a protruding surface 32 that protrudes toward the attaching surface portion 21 from the general surface portion 31, a spring fixing portion 33 on which a part of the coil spring 80 is fixed, engaging portions 34 and 34 extending downward from the left and right lower ends of the general surface portion 31, a rear extending portion 35 that bends rearward from the upper end of the general surface portion 31 and extends rearward, screw through holes 36 formed in the general surface portion 31 such that screws 18 fastened to the storage portion 20 extend through the holes 36 respectively, and positioning holes 37 formed in the general surface portion 31 such that the positioning protrusions 21a extend through the positioning holes 37 respectively.

The protruding surface 32 is formed in a lower center area of the general surface portion 31 and has a generally rectangular shape. A substantially rectangular abutment hole 32a is formed in a center area of the protruding surface 32.

The spring fixing portion 33 is a tongue-shaped portion that extends upward, and is configured to allow the coil spring 80 to hook thereon.

Each of the engaging portions 34 includes an abutting portion 34a that can abut against the respective engaged portion 21b and extends substantially parallel to the general surface portion 31, and a connecting portion 34b that connects the general surface portion 31 to the abutting portion 34a and extends obliquely relative to the general surface portion 31 and the abutting portion 34a.

The screw through holes 36 are formed at four positions corresponding to the respective corners of the general surface portion 31 such that the four through holes 36 surround the protruding surface 32.

The inner diameter of each of the positioning holes 37 is slightly larger than the outer diameter of a root portion of the respective positioning protrusion 21a. The two positioning holes 37 are formed on the right and the two positioning holes 37 are formed on the left. The screw through holes 36 are formed below the positioning holes 37, respectively. The number and the positions of the positioning protrusions 21a and the positioning holes 37 may be appropriately decided under given conditions. This is also true for the screws 18 and the screw through holes 36.

The support portions 40 and 40 extend downward respectively from the left and right ends of the rear extending portion 35. A support portion through hole 41 is formed in each of the support portions 40 such that the shaft member 50 extends through the support portion through holes 41.

Figure 5A:
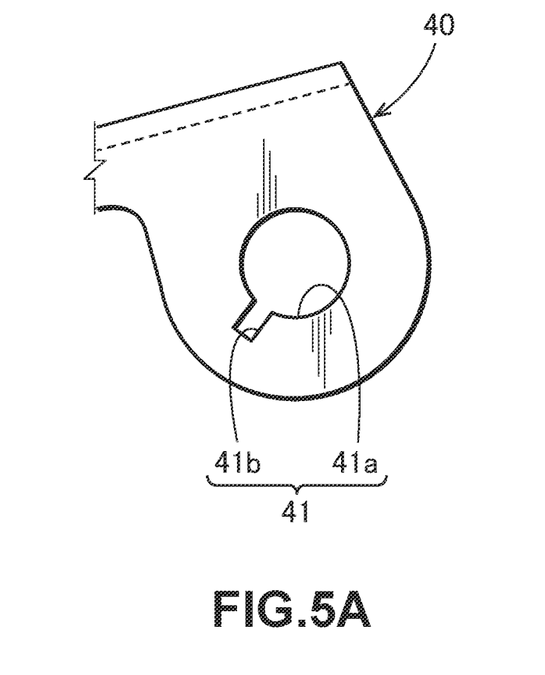
FIG. 5A is a view when looked at in the direction of the arrow 5A in FIG. 3.

Referring to FIG. 5A, each of the support portion through holes 41 includes a circular hole portion 41a that is formed in a substantially circular shape, and a protruding hole portion 41b that protrudes radially outward from the circular hole portion 41a.

Referring to FIG. 3, the shaft member 50 includes a rod-shaped shaft portion 51 that extends through the left and right support portions 40 and 40 and the lid 70, and collars 60 and 60 that surround the shaft portion 51 and provided in the respective support portion through holes 41.

Each of the collars 60 includes a shaft member insertion portion 61 that fits in the support portion through hole 41, a shaft member flange portion 62 that is formed adjacent to the shaft member insertion portion 61 and has an outer diameter larger than the inner diameter of the support portion through hole 41, and a bearing portion 63 that extends from the shaft member flange portion 62 in the axial direction such that the coil spring 80 can contact the outer peripheral surface of the bearing portion 63.

The length of the shaft member insertion portion 61 in the axial direction is greater than the plate thickness of the respective support portion 40. Therefore, the free end of the shaft member insertion portion 61 protrudes from the respective support portion 40.

Figure 5B:
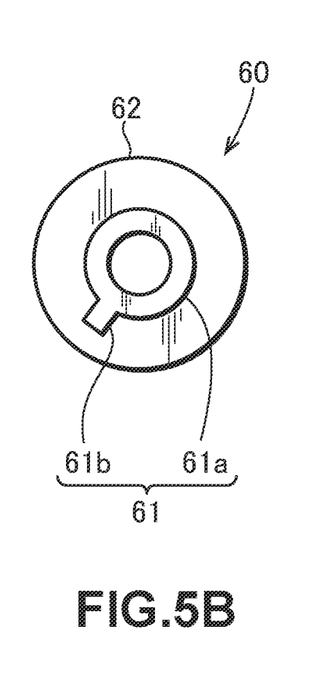
FIG. 5B is a view when looked at in the direction of the arrow 5B in FIG. 3.

Referring to FIGS. 5A and 5B, the outer peripheral surface of the shaft member insertion portion 61 has a shape similar to the inner peripheral surface of the support portion through hole 41. The shaft member insertion portion 61 includes a circular insertion portion 61a that is inserted into the circular hole portion 41a, and a protrusion 61b that protrudes radially outward from the circular insertion portion 61a and is inserted into the protruding hole portion 41b. As the protrusion 61b is inserted into the protruding hole portion 41b, the collar 60 is prevented from rotating.

Figure 2:
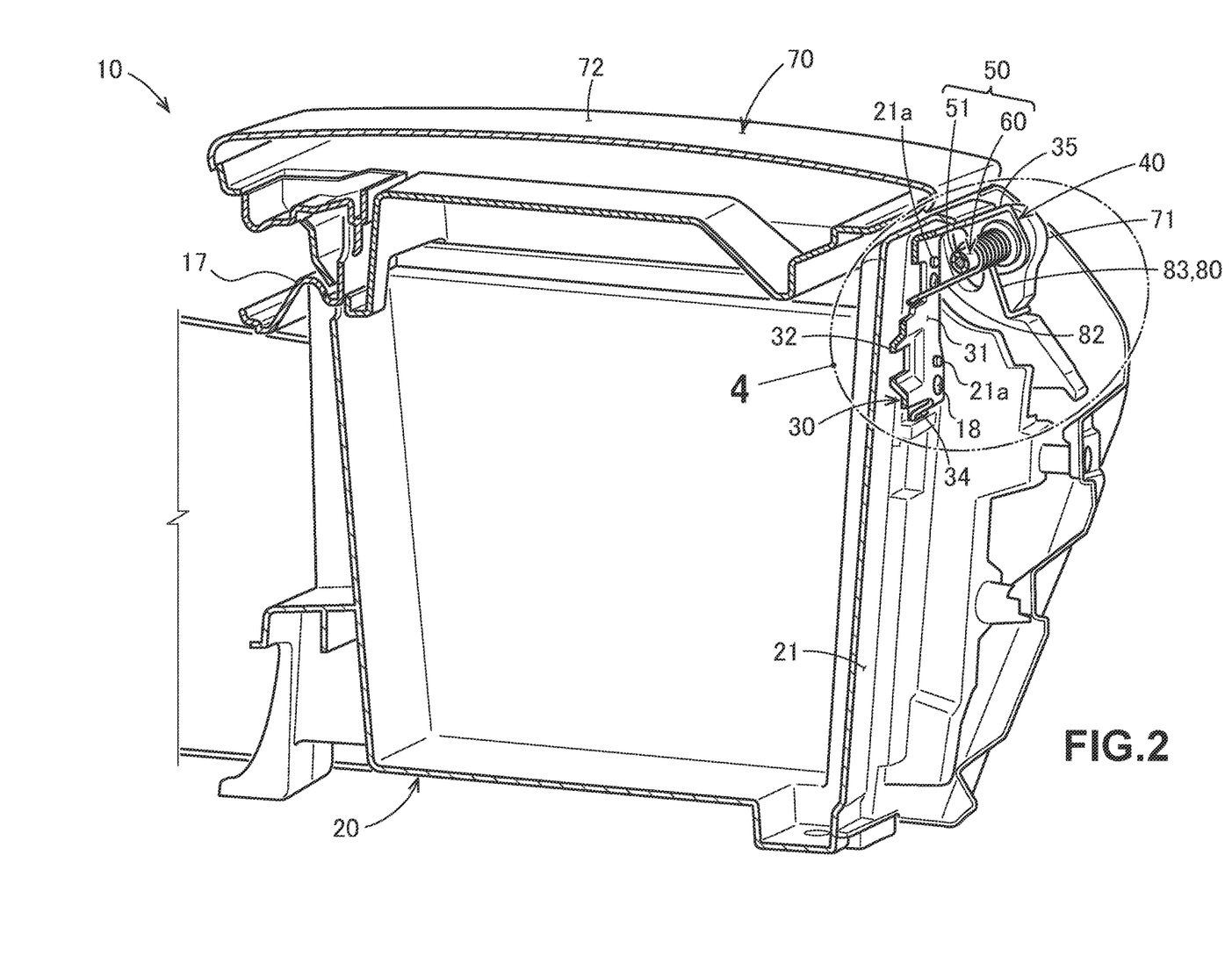
FIG. 2 is a cross-sectional view of the vehicle storage device shown in FIG. 1, viewed from the left.

Referring to FIG. 3, the lid 70 includes left and right lid arm portions 71 and 71 that are respectively disposed on the left of the left support portion 40 and on the right of the right support portion 40 such that the shaft body 51 extends through the lid arm portions 71 and 71, and a lid body 72 that is disposed in front of the lid arm portions 71 and 71 such that the lid body 72 can open and close the top of the storage portion 20 (see FIG. 2).

Each of the lid arm portions 71 has a spring bearing portion 71a that receives the biasing force of the coil spring 80. The spring bearing portion 71a is a concave portion that is formed in a substantially U shape along the biasing direction of the coil spring 80.

Figure 5C:
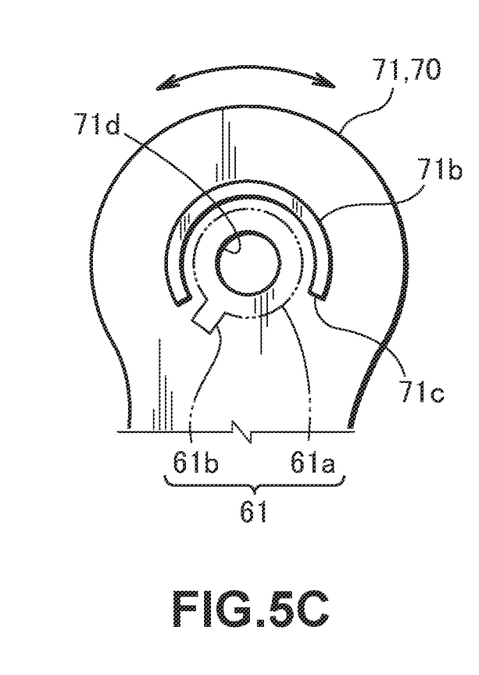
FIG. 5C is a view when looked at in the direction of the arrow 5C in FIG. 3.

Referring also to FIG. 5C, a lid body protrusion 71b is formed on that surface of each of the lid arm portions 71 which faces the support portion 40 such that the lid protrusion 71b protrudes toward the support portion 40 and surrounds the circular insertion portion 61a of the shaft member insertion portion 61. The free end of the lid protrusion 71b abuts against the protrusion 61b when the lid 70 swings. As the free end of the lid protrusion 71b abuts against the protrusion 61b, the swinging of the lid 70 can be regulated. The free end of the lid protrusion 71b may be referred to as a stopper portion 71c that can abut against the protrusion 61b.

A lid through hole 71d through which the shaft body 51 extends is formed in that portion of the lid arm portion 71 which is surrounded by the lid protrusion 71b. The lid through hole 71d is a round hole.

Referring to FIGS. 2 and 3, a hook portion (reference numeral 73 in FIG. 6A) may be formed at the front end of the lid body 72 such that the hook portion hooks onto the lid holding portion 17.

Referring to FIG. 3, the coil spring 80 includes a left winding portion 81 and a right winding portion 81 such that the winding portions 81 are wound along the axial direction to impart a biasing force in the twisting direction. The coil spring 80 also includes one end fixing portion 82 that connects one end of one of the winding portions 81 to one end of the other winding portion 81 and is fixed to the spring fixing portion 33, and distal end portions 83 and 83 that extend, in a substantially L shape, from the respective other ends of the winding portions 81 and 81 and bias the lid arm portions 71 and 71.

Referring to FIG. 2, the lid holding portion 17 may employ a well-known configuration. For example, the lid holding portion 17 may have an operation handle that is operable by a person in the vehicle, and a latch that is displaced upon operating the operation handle. As the person in the vehicle operates the operation handle to displace the latch, the locked state (engagement) between the hook portion of the lid 70 and the latch of the lid holding portion 17 is released. When the locked state is released, the front end of the lid 70 is caused to swing upward by the biasing force of the coil spring 80. As a result, the upper portion of the storage portion 20 is opened. That is, the storage device 10 is brought into the open condition. When closing the lid 70, a person in the vehicle causes the front end of the lid 70 to swing toward the storage portion 20 against the biasing force of the coil spring 80. By squeezing the front end of the lid 70, the lid 70 is engaged with the latch. The opening of the storage portion 20 is closed by the lid 70. That is, the storage device 10 is brought into the closed condition.

Next, a method of assembling the storage device 10 will be described.

Referring FIGS. 2 and 3, firstly, the storage portion 20, the bracket body 30, the shaft member 50, the lid 70 and the coil spring 80 are prepared (preparation step).

Subsequently, the bracket body 30, the shaft member 50, the lid 70 and the coil spring 80 are temporarily assembled (temporary assembly step). More specifically, the bearing portions 63 and 63 are inserted into the winding portions 81 and 81, and the shaft member insertion portions 61 and 61 are inserted into the support portion through holes 41 and 41. Then, the support portion through holes 41 and 41 are aligned with the lid through holes 71d and 71d, and the shaft body 51 is inserted into the through holes 41, 41, 71d and 71d.

Figure 6A:
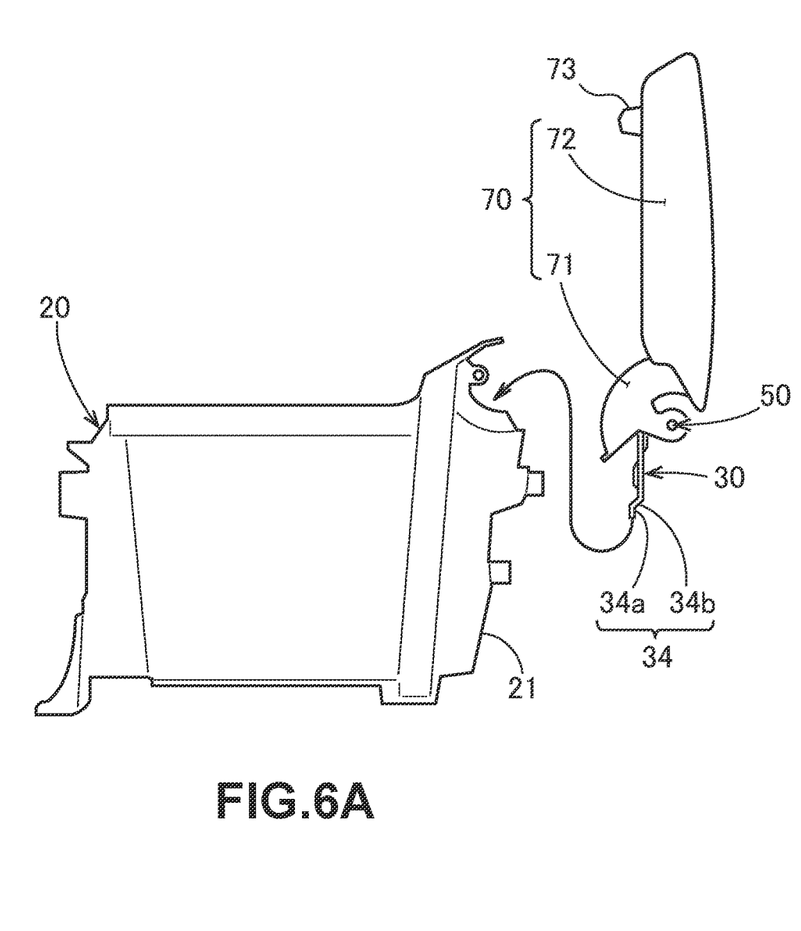
FIG. 6A is a view useful to describe a temporary fixing step.
Figure 7:
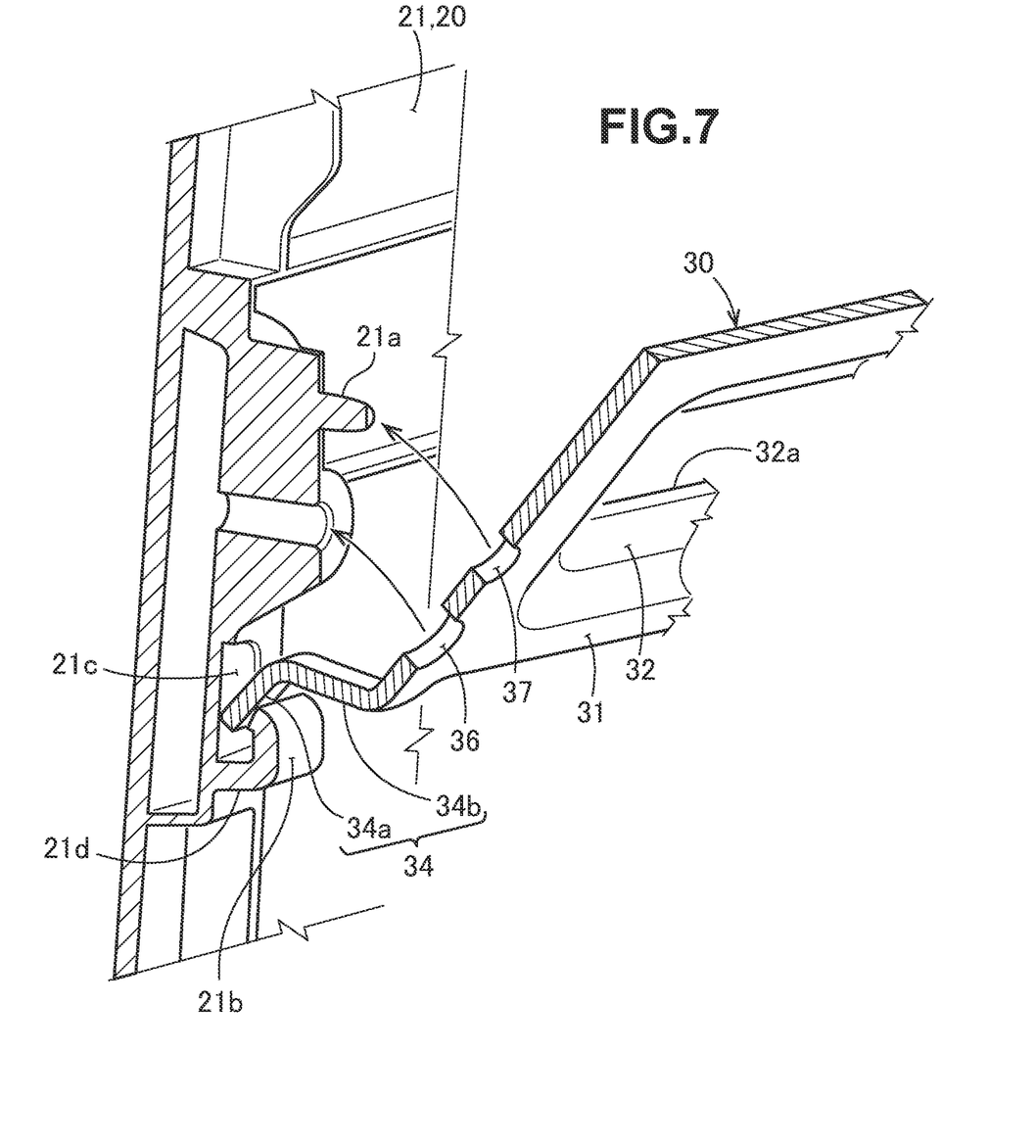
FIG. 7 is a view useful to describe insertion of an engaging portion into an engaged portion.

Referring to FIGS. 6A and 7, next, the engaging portions 34 of the bracket body 30 are inserted into the engaged portions 21b to temporarily fix the bracket body 30 to the storage portion 20 (temporary fixing step). At the time of temporary fixing, it is preferable that the positioning protrusions 21a fit in the positioning holes 37 after the engaging portions 34 are inserted into the engaged portions 21b.

Figures 8A, 8B:
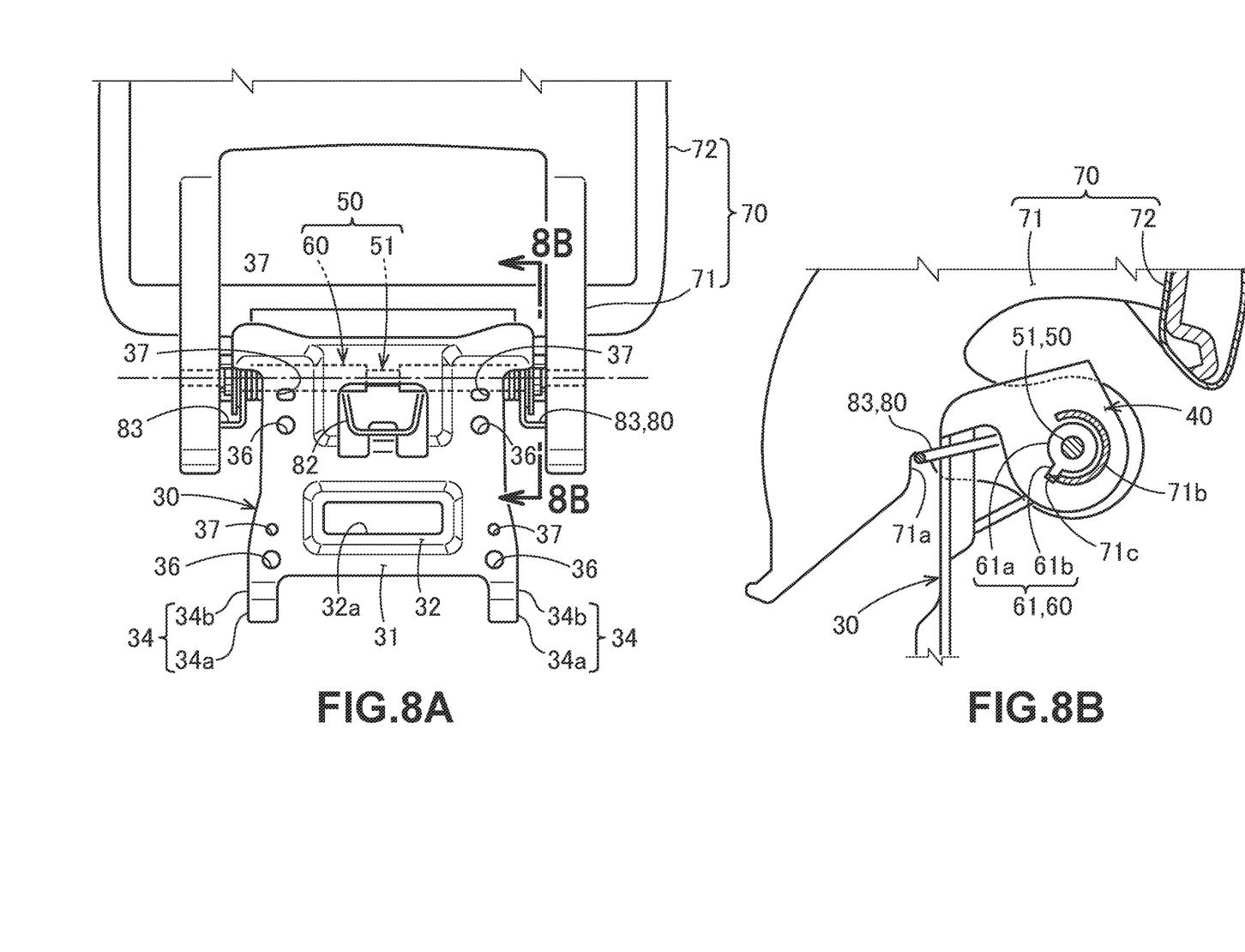
FIG. 8A is a view useful to describe relationship between the bracket body and the lid at the time of the temporary fixing step.
FIG. 8B is a cross-sectional view taken along the line 8B-8B in FIG. 8A.

Referring to FIGS. 8A and 8B, when the temporary fixing is performed, the stopper portions 71c of the lid 70 abut against the protrusions 61b formed on the collars 60. As a result, the bracket body 30 and the lid 70 can be kept substantially straight. The angle formed between the bracket body 30 and the lid 70 is preferably set to an angle that facilitates the work of temporary fixing, and can be set by the positions of the stopper portions 71c.

Figure 6B:
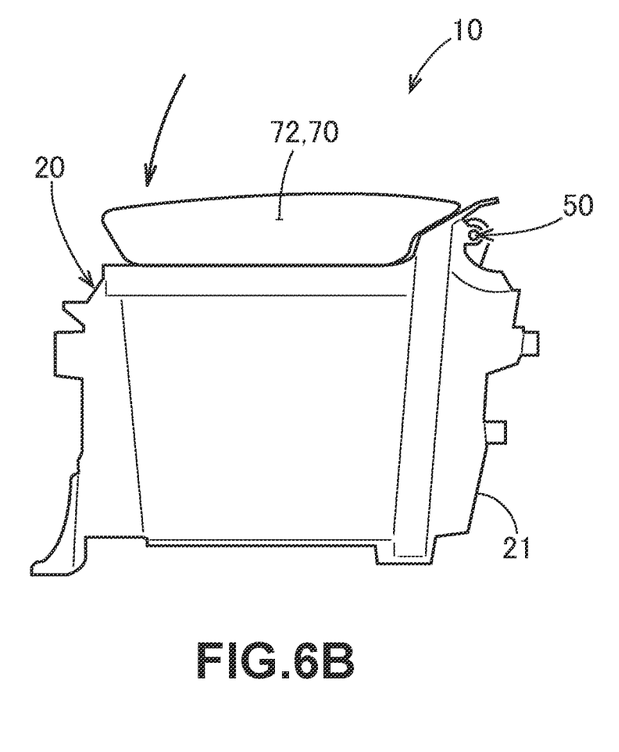
FIG. 6B is a view useful to describe a lid closing step.

Referring to FIG. 6B, next, it is preferable that the opening of the storage portion 20 is closed by the lid 70, and the lid body 70 is held by the lid holding portion 17 (see FIG. 2) provided at the storage portion 20 (lid closing step).

Referring to FIG. 4, next, the bracket body 30 that is temporarily fixed to the storage portion 20 is fixed to the attaching surface portion 21 (non-temporary fixing step). More specifically, the bracket body 30 is fixed to the attaching surface portion 21 with the screws 18. This completes the assembly of the storage device 10. Incidentally, the non-temporary fixing may be carried out by means of certain elements other than screwing.

The above-described storage device 10 will be summarized below.

Referring to FIGS. 2 and 4, the storage device 10 includes the storage portion 20 that has one open face and can store thing(s) to be stored therein, the bracket body 30 fixed to the attaching surface portion 21, which is one face of the storage portion 20, the shaft member 50 supported by the bracket body 30, the lid 70 that is swingably supported by the shaft member 50 such that the lid 70 can open and close at least part of the opening of the storage portion 20, and the coil spring 80 that biases the lid 70 in the opening direction. The bracket body 30 includes the engaging portions 34 extending along the attaching surface portion 21. The attaching surface portion 21 has the engaged portions 21b that define the openings into which the engaging portions 34 are inserted.

The assembling of the storage device 10 is performed through the preparation step of preparing the storage portion 20 having the single open face and the engagement portions 21b formed on the attaching surface portion 21, the bracket body 30 having the engaging portions 34, the shaft member 50, the lid 70, and the coil spring 80, the temporary assembly step of temporarily assembling the bracket body 30, the shaft member 50, the lid 70, and the coil spring 80, the temporary fixing step of inserting the engaging portions 34 of the bracket body 30, on which the lid 70 and the coil spring 80 are temporarily assembled, into the engaged portions 21*b* and temporarily fixing the bracket body 30 to the storage portion 20, and the fixing step of fixing the bracket body 30, which is temporarily fixed to the storage portion 20, to the attaching surface portion 21.

The attaching of the bracket body 30 to the attaching surface portion 21 is performed while the engaging portions 34 are being inserted in the engaged portions 21*b*. This eliminates the need to support the weight of the lid 70 when performing the attaching work. Further, there is no need to support the bracket body 30. As a result, the storage device 10 can easily be assembled.

It should be noted that it is preferable to further include, between the temporary fixing step and the fixing step, a lid closing step of closing at least a part of the opening of the storage portion 20 with the lid 70 such that the lid holding portion 17 provided on the storage portion 20 holds the lid 70.

By keeping the lid 70 in the closed condition, wobbling or the like of the lid 70 can be suppressed or avoided. Further, the bracket body 30 is not caused to swing by the biasing force of the coil spring 80, and therefore the force that presses toward the attaching surface portion 21 is not required. Thus, the attaching of the bracket body 30 to the attaching surface portion 21 is further facilitated. Consequently, the assembly of the storage device 10 is more facilitated.

Referring to FIG. 7, the bottom portions 21*c* are formed on the storage portion 20 such that the bottom portions 21*c* face the respective engaged portions 21*b* and the free ends of the engaging portions 34 can contact the bottom portions 21*c* at the time of inserting the engaging portions 34. The bottom portions 21*c* function as guides, and therefore it is possible to more easily perform the insertion of the bracket body 30 into the engaged portions 21*b*. Thus, the assembly of the storage device 10 is more facilitated.

Furthermore, the lower part of the respective engaged portion 21*b* is closed by a lower surface portion 21*d*. This makes it possible to temporarily assemble the bracket body 30 to a more appropriate position in an easy manner. Incidentally, the lower surface portion 21*d* may be referred to as an opening facing portion 21*d* that closes the position facing the opening of the respective engaged portion 21*b*.

Further, each of the engaging portions 34 includes the abutting portion 34*a* that can abut against the respective engaged portion 21*b* and extends substantially parallel to the general surface portion 31, which constitutes the general surface of the bracket body 30, and the connecting portion 34*b* that connects the general surface portion 31 to the abutting portion 34*a* and extends obliquely relative to the general surface portion 31 and the abutting portion 34*a*. As a result, the abutting portion 34*a* can be formed at a position closer to the attaching surface portion 21 than to the general surface portion 31. Compared with a configuration in which the general surface portion 31 and the abutting portion 34*a* are present on the same plane, insertion of the engaging portions 34 into the engaged portions 21*b* is facilitated. Thus, the assembly of the storage device 10 is more facilitated.

Referring to FIGS. 6A and 8B, the shaft member 50 has the protrusions 61*b* protruding radially outward. In addition, the lid 70 has the stopper portions 71*c* that can abut on the protrusions 61*b* respectively when the lid 70 reaches a predetermined opening angle with respect to the bracket body 30. Thus, it is possible to keep the bracket body 30 and the lid 70 at predetermined opening angles (or predetermined opening degrees) respectively during the assembly work. By keeping them at the predetermined opening angles, it is possible to suppress the wobbling or the like of the bracket body 30 during the attaching work. Thus, the assembly of the storage device 10 is more facilitated.

The storage device of the present invention is suitable for a center console of a passenger vehicle. It should be noted, however, that the storage device of the present invention is also applicable to a glove compartment or the like. Further, the present invention is not limited to those configurations that insert the engaging portions from above the engaged portions, i.e., the present invention also encompasses those configurations that insert the engaging portions into the engaged portions in a horizontal direction or obliquely relative to the vertical direction. In other words, as long as the operations and advantages of the present invention are achieved, the present invention is not limited to the embodiments.

What is claimed is:

1. A storage device for a vehicle, comprising:
   a storage portion that has an opening in its one face and is configured to store items therein;
   a bracket body fixed to an attaching surface portion, which is another face of the storage portion;
   a shaft member supported on the bracket body;
   a lid supported on the shaft member such that the lid can swing to open and close at least part of the opening of the storage portion; and
   a coil spring configured to bias the lid in an opening direction,
   the bracket body including at least one engaging portion that extends along the attaching surface portion, wherein the at least one engaging portion is integrally provided by the bracket body and extends therefrom; and
   the attaching surface portion including at least one engaged portion that has an opening to receive the at least one engaging portion,
   wherein the storage portion has at least one bottom portion that faces the at least one engaged portion respectively such that a free end of each of the at least one engaging portion can abut against the at least one bottom portion when the at least one engaging portion is inserted into the at least one engaged portion.

2. The storage device for the vehicle according to claim 1, wherein each of the at least one engaging portion has an abutting portion that can abut against the respective engaged portion and extends substantially parallel to a general surface portion, which constitutes a general surface of the bracket body, and a connecting portion that connects the general surface portion to the abutting portion and extends obliquely relative to the general surface portion and the abutting portion.

3. A storage device for a vehicle, comprising:
   a storage portion that has an opening in its one face and is configured to store items therein;
   a bracket body fixed to an attaching surface portion, which is another face of the storage portion;
   a shaft member supported on the bracket body:
   a lid supported on the shaft member such that the lid can swing to open and close at least part of the opening of the storage portion; and
   a coil spring configured to bias the lid in an opening direction,
   the bracket body including at least one engaging portion that extends along the attaching surface portion, wherein the at least one engaging portion is integrally provided by the bracket body and extends therefrom; and the attaching surface portion including at least one engaged portion that has an opening to receive the at least one engaging portion, wherein the shaft member has at least one protrusion that protrudes radially outward, and the lid has at least one stopper that can abut against the at least one protrusion respectively when the at least one stopper reaches a predetermined opening angle relative to the bracket body.

\* \* \* \* \*